United States Patent
Singhal

(10) Patent No.: US 9,774,488 B2
(45) Date of Patent: Sep. 26, 2017

(54) APPARATUS AND METHOD FOR A THIN FORM-FACTOR TECHNOLOGY FOR USE IN HANDHELD SMART PHONE AND TABLET DEVICES

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 444 days.

(21) Appl. No.: 13/732,414

(22) Filed: Jan. 1, 2013

(65) Prior Publication Data
US 2014/0189121 A1 Jul. 3, 2014
US 2016/0254940 A9 Sep. 1, 2016

Related U.S. Application Data

(60) Provisional application No. 61/715,738, filed on Oct. 18, 2012.

(51) Int. Cl.
*H04L 29/08* (2006.01)

(52) U.S. Cl.
CPC ........ *H04L 29/08144* (2013.01); *H04L 67/06* (2013.01); *H04L 67/1097* (2013.01)

(58) Field of Classification Search
CPC .............. H04L 67/06; H04L 67/1097; H04L 29/08144; H04L 67/04; H04L 61/609; H04L 67/1021; G06Q 30/0267; A61B 5/155; A63B 2225/20; H04W 4/008; H04W 4/02; H04W 4/00; H04W 4/10; H04W 64/00; H04B 5/0031
See application file for complete search history.

(56) References Cited

U.S. PATENT DOCUMENTS

| | | | |
|---|---|---|---|
| 6,446,141 B1 * | 9/2002 | Nolan .................... | G06F 3/0605 709/203 |
| 6,553,408 B1 * | 4/2003 | Merrell ................. | G06F 3/0601 709/213 |
| 7,263,410 B1 * | 8/2007 | Frederick ............. | A61G 12/001 700/236 |
| 7,600,031 B2 * | 10/2009 | Toutonghi ........... | H04L 12/5835 382/232 |
| 7,725,930 B2 * | 5/2010 | Lawrence et al. .............. | 726/10 |
| 8,156,240 B2 * | 4/2012 | Silberstein ........ | G06F 17/30557 709/206 |
| 8,447,843 B2 * | 5/2013 | Johnson ............... | G06Q 10/103 709/220 |
| 8,554,944 B2 * | 10/2013 | Silberstein ........ | G06F 17/30557 709/206 |
| 8,612,668 B2 * | 12/2013 | Nishimoto ............. | G06F 12/06 365/185.33 |

(Continued)

*Primary Examiner* — Sargon Nano
(74) *Attorney, Agent, or Firm* — Steve Roeder Esq

(57) ABSTRACT

A mobile handheld wireless communication device has a storage memory resource management function operative in a processor and a memory of the device. The resource management function manages storage memory resources in the device by dynamically determining a storage level of content in storage memory of the device and pushing content exceeding a storage threshold A to a nearest wireless accessible server, and pulling content from the server below a storage threshold B, thereby minimize the size of storage in the device and thus minimize size and weight of the device in user hands.

16 Claims, 13 Drawing Sheets

(56) References Cited

U.S. PATENT DOCUMENTS

| | | | |
|---|---|---|---|
| 8,655,842 B2* | 2/2014 | Xu | G06Q 50/01 707/628 |
| 8,843,597 B2* | 9/2014 | Leblanc | H04L 12/5695 370/468 |
| 2002/0049826 A1* | 4/2002 | Ariga | 709/216 |
| 2004/0068634 A1* | 4/2004 | Otsuka | 711/170 |
| 2005/0015617 A1* | 1/2005 | Karsten | H04L 63/0209 726/4 |
| 2005/0144570 A1* | 6/2005 | Loverin | G06F 3/0481 715/822 |
| 2005/0204311 A1* | 9/2005 | Kim | G06F 3/0482 715/823 |
| 2006/0111083 A1* | 5/2006 | Goss | 455/412.1 |
| 2006/0116988 A1* | 6/2006 | Toebes et al. | 707/3 |
| 2006/0230270 A1* | 10/2006 | Goffin | 713/173 |
| 2007/0183389 A1* | 8/2007 | Clee et al. | 370/347 |
| 2008/0140941 A1* | 6/2008 | Dasgupta | G06F 17/30132 711/137 |
| 2009/0064056 A1* | 3/2009 | Anderson et al. | 715/864 |
| 2009/0100127 A1* | 4/2009 | Dasgupta | G06F 17/30132 709/203 |
| 2009/0172168 A1* | 7/2009 | Sonoda et al. | 709/226 |
| 2010/0039399 A1* | 2/2010 | Kim | G06F 3/0482 345/173 |
| 2010/0069092 A1* | 3/2010 | Bajpai | H04W 4/02 455/456.3 |
| 2010/0131592 A1* | 5/2010 | Zhang et al. | 709/203 |
| 2011/0153810 A1* | 6/2011 | Raja et al. | 709/224 |
| 2012/0102116 A1* | 4/2012 | Shi | H04L 29/08729 709/204 |
| 2012/0137287 A1* | 5/2012 | Pang et al. | 718/1 |
| 2012/0226554 A1* | 9/2012 | Schmidt | G06Q 30/0261 705/14.58 |
| 2012/0254435 A1* | 10/2012 | Zhaofu et al. | 709/226 |
| 2013/0029652 A1* | 1/2013 | Nakrani | H04L 67/1097 455/418 |

* cited by examiner

| Storage type 45 | Size as a % of total 46 | Initial threshold T1 48 | push threshold T2 50 | pull threshold T3 52 |
|---|---|---|---|---|
| Applications 32 | 30% | 50% | 60% | 40% |
| Video clips 34 | 15% | 50% | 70% | 60% |
| Images 36 | 10% | 50% | 60% | 40% |
| Personal Data 38 | 5% | 50% | 75% | 40% |
| Business Data 40 | 5% | 50% | 60% | 50% |
| E-mails 42 | 10% | 50% | 50% | 50% |
| Music files 44 | 15% | 50% | 50% | 50% |

Figure 5

Dynamic Logic 21
- individual storage thresholds
- individual storage size

Based on rate of new content added to device
For individual storage types.  20E

IF (rate of new content added) exceeds = Threshold
Increase threshold T1  20F
Repeat for storage types

Figure 9C

Buffer Logic 17

IF (buffer has content) determine type of content 17A

IF (buffer content is from memory 30C) Schedule push of content to server. 17B

IF ( buffer content is from server 22), determine Type of content and move to respective storage 30C
17C

Figure 9D

At step 100, having by the mobile handheld wireless communication device a storage memory resource management function operative in a processor and a memory of the device;

At step 102, managing by the resource management function storage memory resources in the device by dynamically determining a storage level of content in storage memory of the device and pushing content exceeding a storage threshold A to a nearest wireless accessible server, and pulling content from the server below a storage threshold B, thereby minimize the size of storage in the device and thus minimize size and weight of the device in user hands.

At step 104, allocating by the function device storage, not used by device OS, into different types of storage based on types of data being stored therein.

At step 106, partitioning the storage content into categories of, images, video clips, application categories, music files, and personal data related to contacts, medical, financial data, business data, and e-mails.

At step 108, assigning each category of data a user settable storage memory and a storage memory threshold;

At step 110, setting the storage memory threshold initially at 50% of the storage memory allocated to that category of content.

At step 112, allocating by the function a priority of storage content for each item of content for each category of content based on user set priority and/or frequency of use.

At step 114, maintaining by a function a table of servers and their physical location and their URL addresses;

At step 116, determining by the function nearest server based on GPS data of the device and uses the nearest server for pushing and pulling content from and to the server.

At step 118, having a search and retrieve function that searches and retrieves stored contents in either the device-storage or in the wireless-accessible server.

At step 120, having a user interface by the search and retrieve function has a user interface providing for a selected data type and time window, display of list of items that are in the device in color A and those that are in the server in color B.

At step 122, enabling by the user interface selection of the items in the list and their movement from either the device to the server or from the server to the device.

At step 124, updating by the user interface, after movement of data items from the server to the device or device to server, the color display of the items in the list of items.

Figure 10

APPARATUS AND METHOD FOR A THIN FORM-FACTOR TECHNOLOGY FOR USE IN HANDHELD SMART PHONE AND TABLET DEVICES

CROSS REFERENCE

This application claims priority from Provisional Application Ser. No. 61/715,738, filed Oct. 18, 2012, of Tara Chand Singhal, titled, "Thin-Form Factor Handheld Smart Phone and Tablet Device. The contents of provisional application 61/715,738 are incorporated herein by reference.

FIELD OF THE INVENTION

Apparatus and method for a thin form-factor handheld smart phone and tablet device to reduce weight and size is described. The embodiments teach a device with reduced storage memory working in conjunction with a wireless server.

BACKGROUND

Portable handheld wireless devices such as smart phones and tablets come equipped with a large storage memory much like the laptops and the desktops. This large storage size is expected to fulfill storage needs in these devices for years of use as new applications and data are stored in these devices.

As an illustration, smart phones come with basic 8 G bytes and options of 16 and 32 G bytes. Such a large storage size is not expected to be used in the foreseeable future and is thought of the largest possible storage that may be required over the life of the device's useful life. Same is true for the tablet computers like the iPad®.

Unlike the laptops and desktops, these smart phones and tablets are portable being carried in pocket and brief case and designed for being handheld. Hence weight and size of these devices is an important consideration unlike for the laptops and desktop computers which are kept on a table.

As an illustration of the importance of the size and weight of these handheld and portable wireless devices, both Samsung and Apple announced new products such as iPhone® 5 and Samsung Galaxy® 3s which claim to be thinner and lighter weight then their immediate predecessor models. Further the appeal of iPad® is based on it being a slim form-factor device.

Hence, it is the objective of the embodiments herein to be able to even further reduce the weight and thickness size of these devices in the user hand. It is yet a further objective to reduce the cost of such devices to the users.

SUMMARY

The improvements and advancements in the wireless devices and the wireless networks that support such wireless devices have been nothing short of breath-taking. In the devices, the processor speeds and memory size, and in the networks the network speeds such as LT 4GE and further expected improvements in the networks makes possible always-connected devices.

Further, the combination of network speeds and improvements in streaming technologies, the need to store vast file sizes in handheld devices is minimized. Moreover, the wireless carriers have begun to provide flat fee monthly data plans for large block of data in multiples of gigabytes. It is believed, these advancements and features support the embodiments described herein.

The embodiments described herein, provide smart phones and tablets with very limited physical memory in the device itself. That limited memory working in conjunction with a virtual memory in a wireless server via a push-pull function in the device and the server provides the storage memory in these devices that may be required for the foreseeable life use of these devices without burdening the device itself with a large storage memory size that is expected to be used over many years and thus reduce cost, size and weight of such devices in the user hands.

To achieve the above purpose, a mobile handheld wireless communication device has a storage memory resource management (SMRM) function operative in a processor and a memory of the device.

The SMRM function manages storage memory resources in the device by dynamically determining a storage level of content in storage memory of the device and pushing content exceeding a storage threshold A to a nearest wireless accessible server, and pulling content from the server below a storage threshold B, thereby minimizing the size of storage in the device and consequently size and weight of the device in a user's hands.

The SMRM function allocates or partitions device storage, not used by device OS, into different types of storage based on types of data being stored therein. For each type of storage, with its own storage threshold, the SMRM function executes a push-pull function in the device in conjunction with a wireless server to dynamically optimize the memory usage in the device for that type of data. This process is repeated for different types of storage data with their own storage thresholds. Thus the SMRM function, it is believed, by many orders of magnitude, reduces physical storage memory in these devices.

As a simplified illustration, prior art FIG. 1 shows the typical devices 10 from the current prevalent practice of 8, 16 and 32 G bytes storage memory. FIG. 2 shows a device 11 of the embodiments with a storage memory size that is only a fraction of the prior art device 10. Such a reduced storage memory size, it is believed would have a direct impact on the size and weight of the device, leading to a lighter and thinner smart phone and tablet devices.

These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIG. 5 is a block diagram that illustrates use of different threshold for the storage memory of a thin phone of the present embodiments;

FIG. 9A is a method block diagram of the setup function logic used for operation in the device and the server of a thin phone of the present embodiments;

FIGS. 9B and 9C are method block diagram of the different types of logic used for operation in the device and the server of a thin phone of the present embodiments;

FIG. 9D is a method block diagram of the logic used for operation in the device and the server of a thin phone of the present embodiments; and FIG. 10 is a method block diagram of the thin phone of the present embodiments.

DESCRIPTION

Introduction

Figure 1:
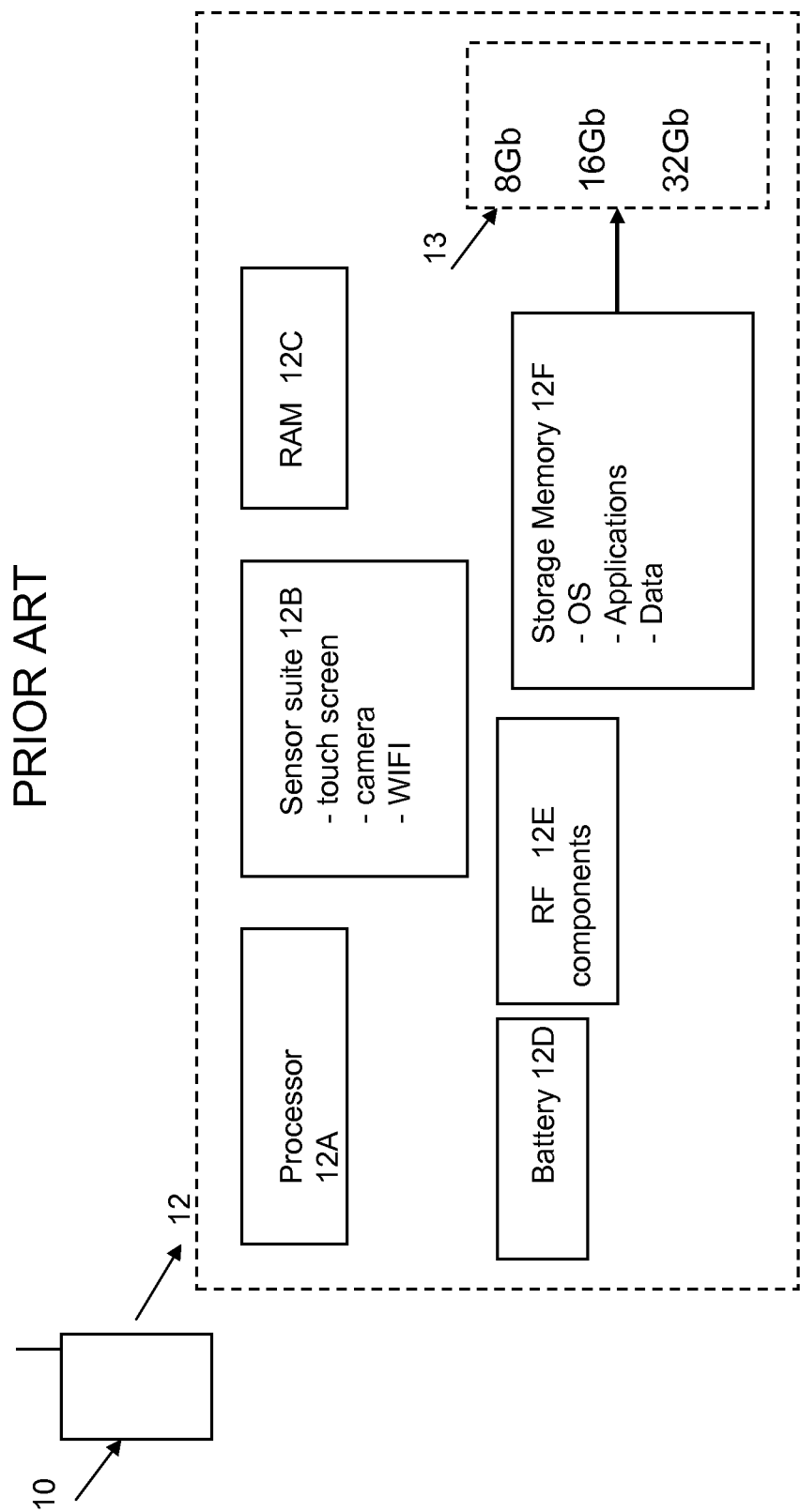
FIG. 1 is a prior art block diagram that illustrates features of a prior art smart phone.

With reference to PRIOR ART FIG. 1, a prior art portable wireless computing and communication device 10, such as a smart phone, has the following, it is believed, required components within the device 12. These essential components 12 are processor 12A, sensor suite 12B, RAM 12C, battery 12D, RF components 12E and storage memory 12F.

In typical such devices the storage memory size 13 of the device, is sized based on user needs as one of either 8 G bytes, 16 G bytes and 32 G bytes. Such a large storage memory 13 is driven by the foreseeable need over the life of the device to store applications and data. Such a large storage memory 13 in these handheld mobile devices 10 which strive to be light-weight with reduced thickness is unnecessary in view of improvements in wireless network speeds and device processor speeds.

Figure 2:
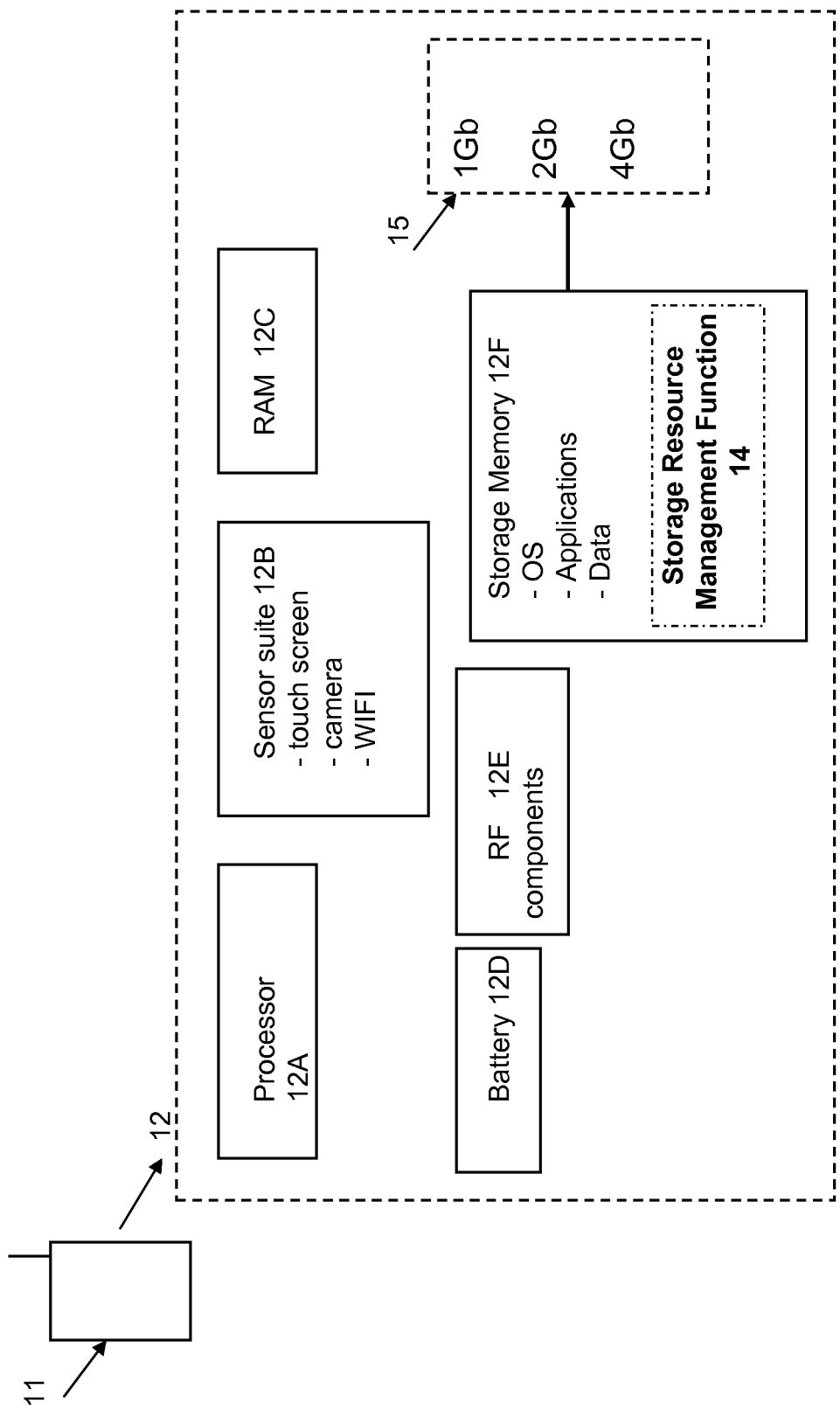
FIG. 2 is a block diagrams that illustrates features of the present embodiment of a thin phone with reduced storage memory.

With reference to FIG. 2, in a preferred embodiment, the portable wireless computing and communication device 11, in addition to the prior art components 12A, 12B, 12C, 12D, 12E, and 12F, also has a storage resource management function 14 in the storage memory 12F, which is operative in the processor 12A. This function 14 reduces the need for storage memory 15 to be a small fraction of that provided in the prior art mobile device 10 as in FIG. 1.

Figure 3A:
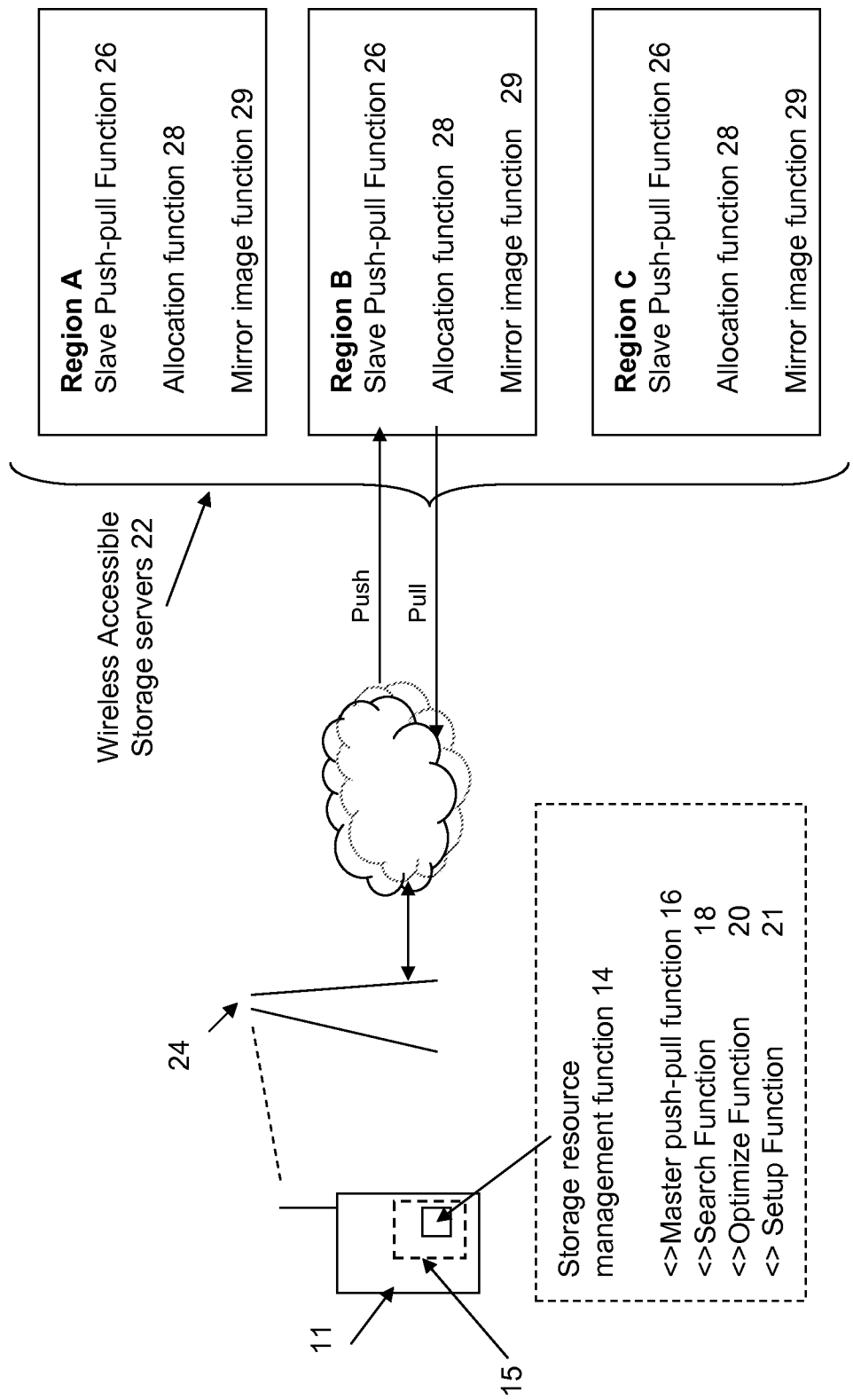
FIG. 3A is a block diagram that illustrates features of the present embodiment of the invention of a thin phone and its operation with wireless servers.

With reference to FIG. 3A, the device 11 with the resource management function 14, in storage memory 15, works in conjunction with a wireless network 24 and wireless server 22. The function 14 has functions of master push-pull function 16, search function 18, an optimize function 20, and a setup function 21. The wireless accessible server 22 has a corresponding slave push-pull function 26 and a storage allocation function 28.

The master push-pull function 16 operative in the device 11 automatically and dynamically pushes storage content exceeding a storage threshold T2 in device 11 to the server 22 and pulls storage content below a threshold T3 to the device 11 from the server 22 so that the operations of these master and slave push pull functions 16 and 26 are transparent to the user. The master push-pull function 16 in the device 11 works in conjunction with a slave push-pull function 26 in the server 22.

Figure 4:
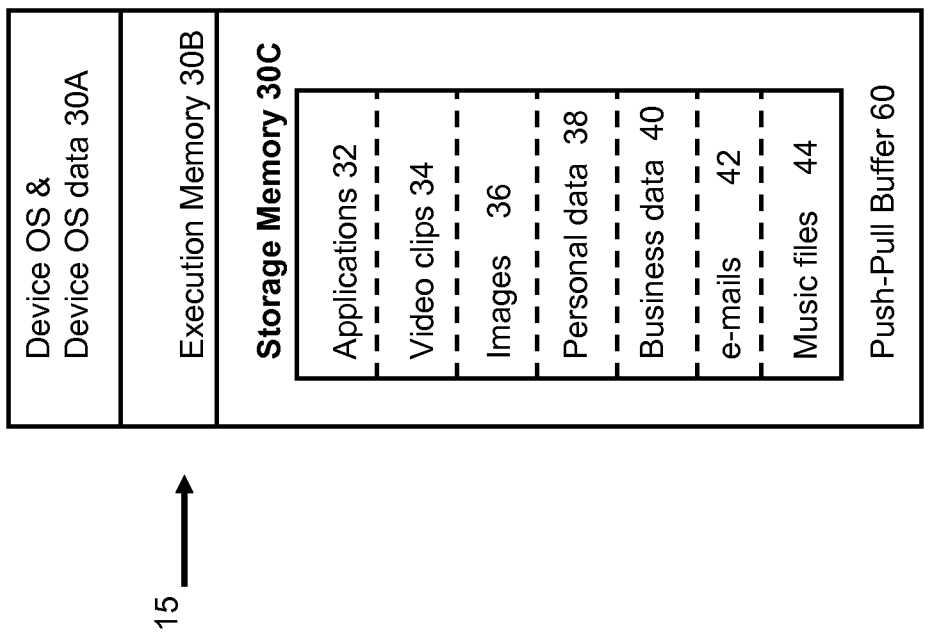
FIG. 4 is a block diagram of the storage memory of a thin phone of the present embodiments.

As illustrated in FIG. 4, the storage memory 15 of device 11 is partitioned into three parts; memory 30A for use with device OS and supporting data, memory 30B to support execution of programs in the RAM, and memory 30C for storage of data and applications. The memory 30C is further partitioned into a push-pull buffer 60 and into different types of data that may be stored therein. The data that may be stored therein may include, applications 32, video clips 34, images 36, personal data 38, business data 40 and e-mails and messages 42, and music files 44. These types of data are for illustration purpose and there may be more or fewer such data types that may be used to support efficient operation of the SMRM function 14.

As illustrated with reference to FIG. 4, the storage memory 30C in device 11 has a push pull buffer 60 that is sized to enable the push pull function 16 to operate in off-peak times such as in night once a day or week or any other periodicity or non-periodicity depending upon the rate at which new content is added to the device 11 storage memory 30. Hence the size of push-pull buffer 60 in device 11 is determined by the rate of new content that is added to the storage 30C.

The wireless communication network capacity of 4G LTE networks, it is believed, make such a transparent push-pull function possible and thus provide a user with unlimited storage for the life of the device and beyond while having minimal physical storage 15 in the device 11 itself.

An allocation function 28 in server 22 enables the slave push pull function 26 to allocate whatever storage is required in the server 22 for each device 11 for a large group of users in the millions.

As illustrated in FIG. 3A, there may be a plurality of servers 22 in different regions of the country positioned close to population centers. Each of these servers 22 would have a mirror image function 29 that would contain mirror image of the content so that the device 11 user may move about over a large geographic area and still have access to a nearest server 22.

Figure 3B:
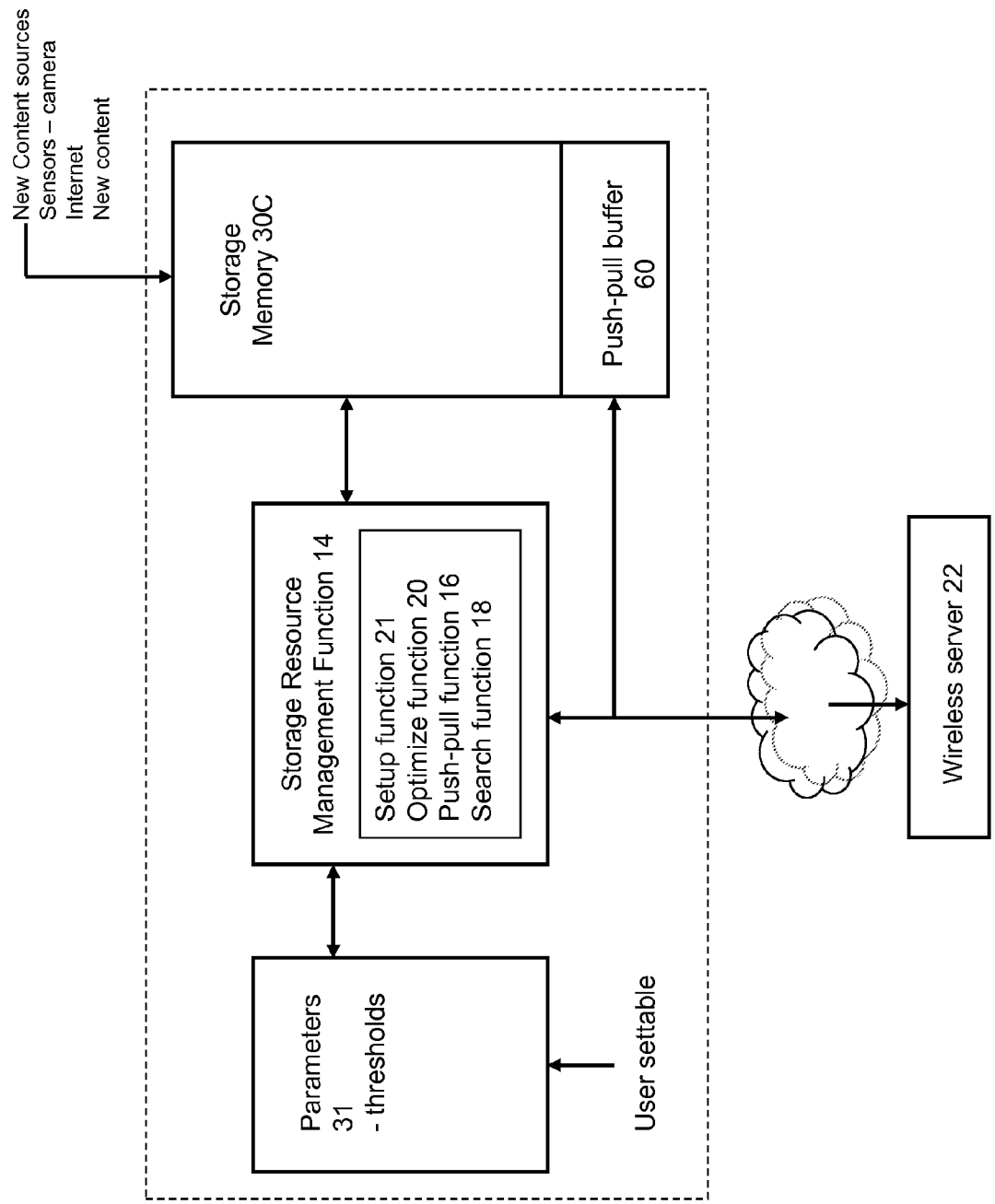
FIG. 3B is a block diagram that illustrates features of the present embodiment of the invention of a thin phone and its functional and interface operations.

As also illustrated in FIG. 3B, the storage resource management (SRM) function 14 has sub-functions of (i) set up function 21, optimize function 20, push-pull function 16 and a search/retrieve function 18. The function 14 interfaces with the user settable parameters 31, storage memory 30C and push-pull buffer 60 and wireless server 22. The storage memory 30C receives new content for storage from sensors such as cameras, and data and files from the Internet.

These and other aspects of the embodiments are described in detail herein where the headings are provided for reader convenience.

Wireless Server 22

Wireless server (as shown in FIGS. 3A and 3B) is positioned close to population centers and is wireless accessible and thus likely to be part of the wireless carrier networks.

The server 22 has a slave push pull function 26, a security and an account and allocation function 28 and a mirror image function 29. The mirror image function 29 is optional and its need is decided by the latency that would be experienced in retrieving content. If as designed and intended, the push-pull function operative in device 11, operates in off-peak time, there may not be a need for mirror-imaged servers or there would be need for a fewer such mirror image servers.

Resource Management Function 14

Figure 6:
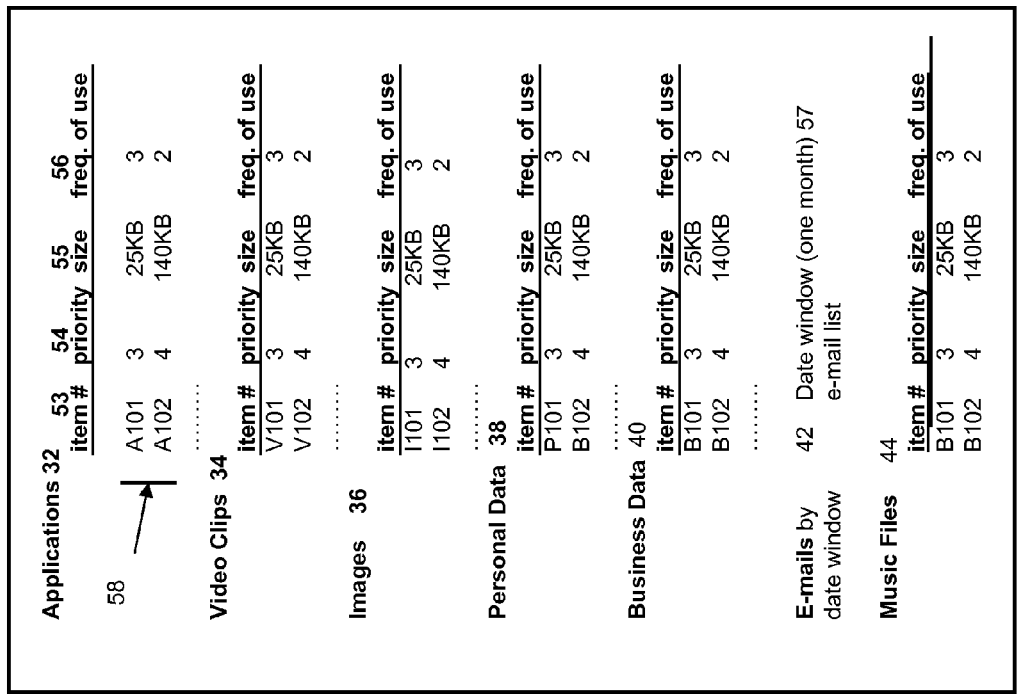
FIG. 6 is a block diagram of the use of different data types and their identifications used to optimize storage memory of a thin phone of the present embodiments.
Figure 7A:
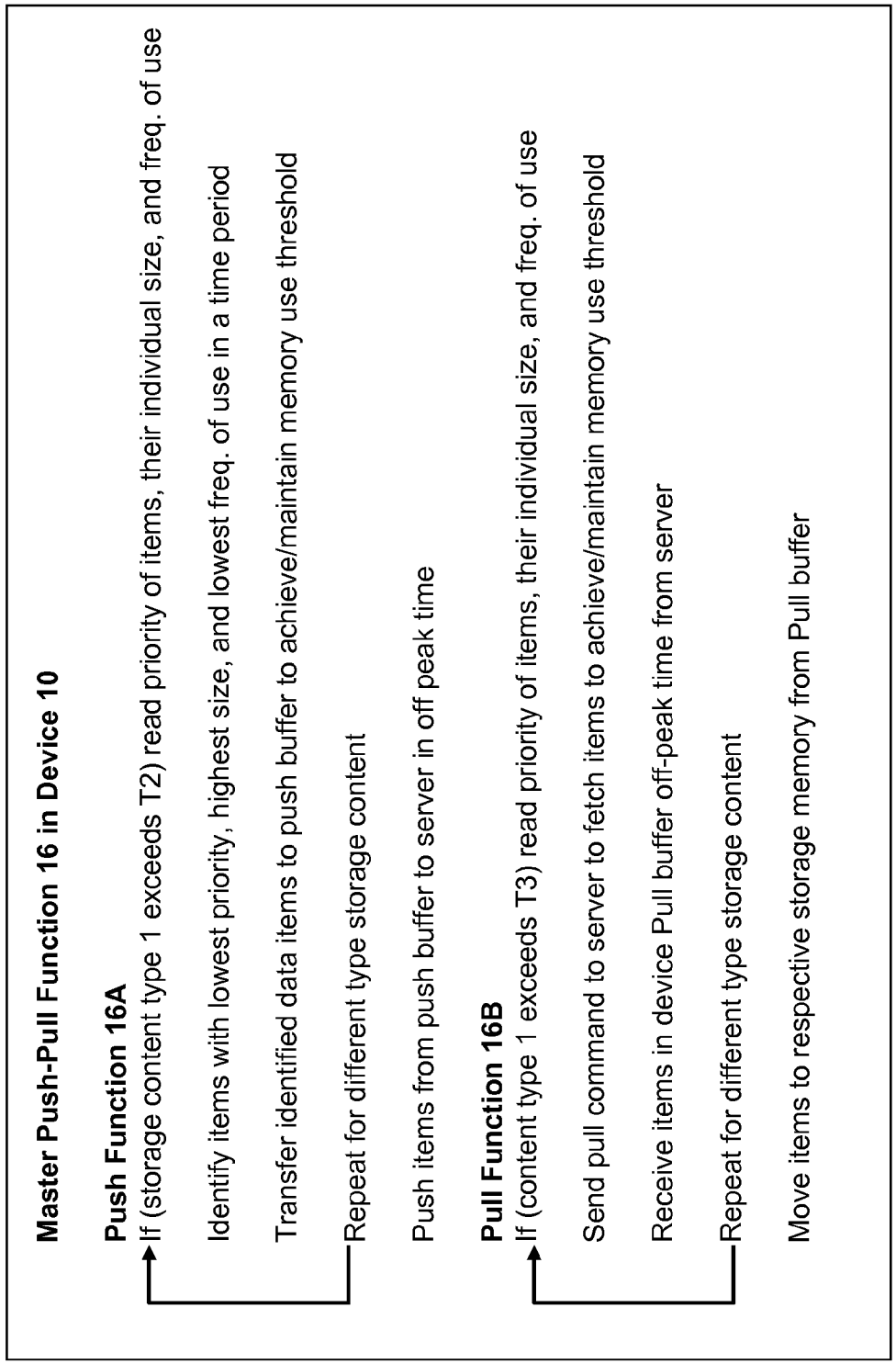
FIG. 7A is a block diagram of the push-pull function operation in the device of a thin phone of the present embodiments.
Figure 7B:
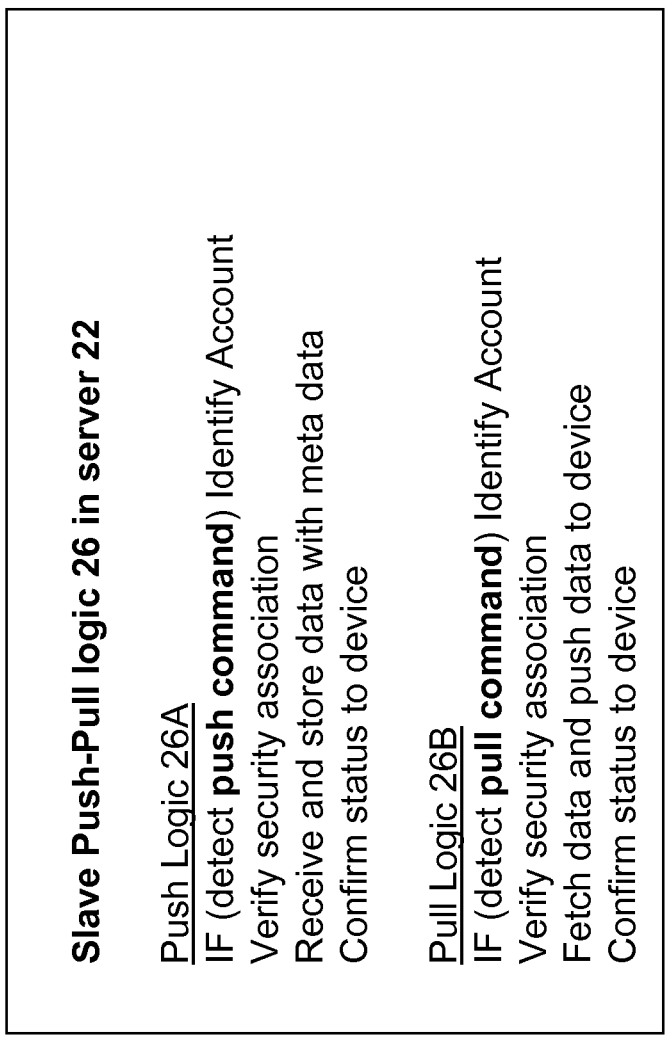
FIG. 7B is a block diagram of the push-pull function operation in the server of a thin phone of the present embodiments.
Figure 8:
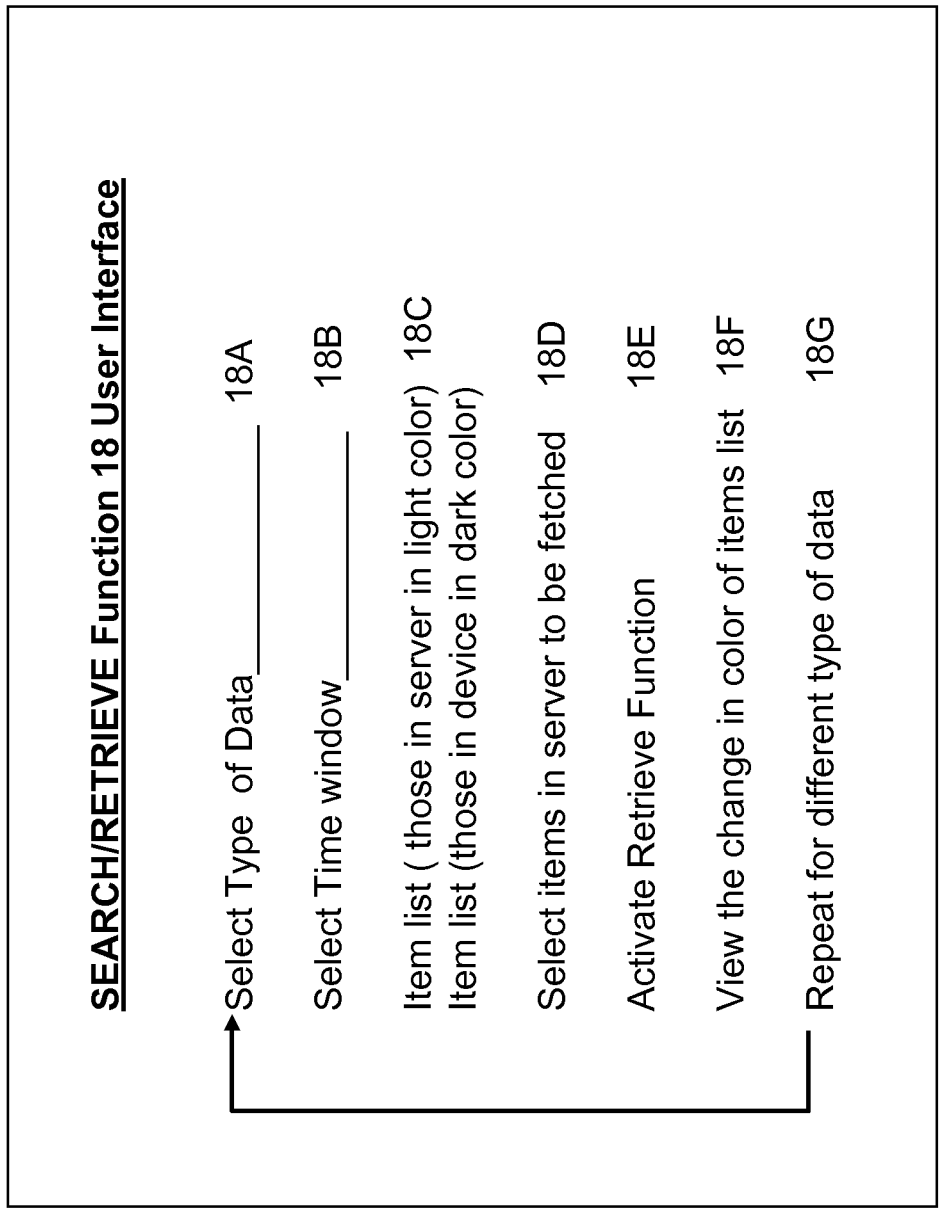
FIG. 8 is a block diagram of the methods for a user interface for a search/retrieve function operation in the device and the server of a thin phone of the present embodiments.

The resource management function 14 is described with the help of FIGS. 4, 5, 6, 7, 8 and 9. FIG. 4 illustrates how the storage memory 15 in the device 11 is utilized. FIG. 5 illustrates use of storage and push-pull thresholds for each type of storage content. FIG. 6 describes attributes of different items in each of the storage categories to facilitate push-pull function. FIG. 7A describes push pull function that is operative in the device 11 and FIG. 7B illustrates the slave push pull function that is operative in the wireless server. FIG. 8 illustrates a user interface for a search/retrieve function. FIG. 9A illustrates a setup operation. FIGS. 9B and 9C illustrate features of optimization logic. FIG. 9D illustrates Push-pull Buffer logic.

Storage Memory 15

As illustrated in FIG. 4, the storage memory 15 in device 11 is partitioned as follows: Device Operating System and drivers and supporting data 30A, execution memory or memory 30B in support of random access memory, and storage memory 30C. Thus the storage memory 30C is called user available storage memory (UASM)

The UASM 30C is further partitioned into different type of storage content such as applications 32, video clips 34, images 36, personal data 38, business data 40, e-mail 42, and music files 44. It should be born in mind that the application data type 32 is not for the major applications such as Microsoft Office applications, but those applications that are likely to be down loaded by a user from an APP store such as iTunes®. These types of storage contents are likely to be different for different users in how they utilize such devices.

In addition a part of the storage memory 30C is allocated to a push-pull buffer 60. There may be two parts to the push-pull buffer, 60A part and a 60B part (not shown). The part 60A is utilized to temporarily store data items before they are pushed to the server 22 and part 60B is utilized to temporarily store data items from the server 22, before they are moved into different types of memory in memory 30C.

Initial Allocation of Storage Memory 30C

As illustrated in FIG. 5, for each of these storage types 45 of storage content (32 to 44), a proportional percentage of available storage memory 30C is allocated. As a simplified illustration, column 46 identifies that proportional size.

As a simplified illustration, application 32 may be allocated 25%; video clips 34 may be allocated 20% and so on. These initial allocations are based on a typical user and are subject to change for individual users based on the user settable parameters 31 and/or via an. optimization logic. The optimization logic determines the rate of input of different types of new data for storage into the storage memory 30C and based on that pattern of use of an individual device alters or adjusts these initial allocations. As a simplified illustration, a user loads or stores large music files and does not store large number of e-mails, then the optimization logic may increase the allocation to the music files and reduce the initial allocation to the e-mails.

The details of the optimization logic 21 described later with reference to FIGS. 9B and 9C.

Memory Use Thresholds

There are three different memory thresholds that may be used in the SMRM function 14. The first of these thresholds is T1 and is used to allocate a safe percent use of the individual data type. By default and customary practice this default for all data types is set at 50%, even though it may be different for different data types and their pattern of use in an individual device 11.

This threshold T1 determines how much each of the data types may be stored in memory 30C without a need to trigger the use of the push-pull function 16.

It should be noted that in a normal course of device 11 use, different types of the data is being dynamically and unpredictably being added to the memory 30C based on each individual user use profile of the device 11.

The second of these memory thresholds is T2 is used to determine when the content of each of the individual memory types should be moved to the push-pull buffer 60 for moving there from to the wireless server 22.

The third of these memory thresholds is T3 and is used to determine when the storage use in the device for each of the data types has fallen below Threshold T1, so that the content that is stored in the server 22 may be brought back to the device 11.

FIG. 5 illustrates a table that facilitates description of each of these three Thresholds T1, T2 and T3. It should be noted that the initial allocation as in column 46 is percent of Memory 30C. The threshold T1 in column 48 is a percent of column 46. The column 48 in FIG. 5 is for initial threshold T1 48, for each of these storage types 45. As a simplified illustration that initial threshold T1 is 50%.

The next two columns identify a push threshold T2 50 and a pull threshold T3 52, again in percentages. Again threshold T2 and threshold T3 thresholds are percentages of threshold T1.

As a simplified illustration, if storage memory 30C is 1 G byte in size, then based on applying the threshold T1 of 30% to storage memory 30C, the applications 32 are allocated a storage memory of 300 M bytes. Of this allocation of 300 M bytes, the initial threshold T1 is 50% that is 150 M bytes, that is, applications exceeding 150 M bytes may be moved to the push pull buffer 60 from the applications area 32 to be pushed to server 22.

When new applications are added and the storage size exceeds threshold T2 60% or 180 M bytes, a push threshold T2 is exceeded and a logic based on the type of application and its use pushes a part of the applications content to the push pull buffer 60. That is the size of the application type memory in the device 11 can grow to 180 M bytes, before the push-pull function 16 of the SMRM function 14 is activated. It should be born in mind that these are the not the major applications such as Microsoft Office applications, but those are applications that are likely to be down loaded by a user from an APP store such as iTunes®.

If the application area 32 contents fall below threshold T3 40% or 120 M Bytes, push-pull logic 16 determines what applications, if any, need to be pulled back from the server 22 into the push-pull buffer 60.

Buffer logic 21, as described later with reference to FIG. 9D, either moves the push-pull buffer 60 content to the storage 30C of device 11 or to the virtual storage in server 22. To facilitate such data movement, push-pull buffer 60 has two parts 60A and 60B (not shown).

The buffer 60A is used to temporarily store data items from the memory 30C, until these items are pushed to the wireless server 22 in off-peak time. The buffer 60B is used to temporarily store data items sent or retrieved from the wireless server 22, until it is moved into the memory 30C.

As illustrated with the help of FIG. 6, storage content items for each type of storage are identified by a reference number 58. Each item 58 is identified in a table, with item number 53, priority 54, size 55 and frequency of use 56.

An optimization logic 20, as described later with the help of FIGS. 9B and 9C and with the use of the threshold parameters 31 as described in FIG. 5, decide which of these items and when are shuttled back and forth between the device 11 storage 30C and virtual storage in server 22, so that the device 11, even though having a limited physical storage memory, relies on the virtual memory in server 22 to let a user use as much storage memory as they may need over the life use of the device 11.

The thresholds described above are merely illustrative of the present embodiments and there may be more or less or different type of thresholds that may be used to accomplish the features of the SMRM function 14 and they are not rules out.

Mode of Use of SMRM Function 14

When the push-pull function 16 in the device 11 would be activated depends on how the device is used by a user in terms of adding new content in any of the different data types. Hence, the push-pull function 16 may not be used at all or used after considerable period of time when the device 11 use began.

The SMRM function 14 has no need to use the push-pull function 16, until threshold T2 for a data type is exceeded. Furthermore the optimization function 20 is updating the initial allocation and the threshold T1.

As a simplified illustration, if a user on day 100 of use of the device 11, adds large amount of data types of, images representing photographs that may be taken by a user, the optimization logic 20 would detect that large increase in this type of data in memory 30C and increase the initial allocation to this data type and also may increase the initial threshold T1. These two changes would automatically increase the Threshold T2, delaying the use of the push-pull function 16 for this data type.

Therefore, the SMRM function 14 is constantly adjusting the various settings to minimize use of the push-pull function 16. That is, the sizes of various data types and their thresholds are dynamically being adjusted.

Furthermore the sizes of the various data types and their thresholds are designed to offload the use of the push-pull function to the background that does not affect the operation of the device 11 in the user hands. That is, the use of SMRM function 14 in the device 11 is transparent to the user. Yet SMRM function 14 provides whatever storage memory a user would need in the device for the foreseeable use of the device over many years.

Master Push Pull Function 16

The master push-pull function 16 has a push function 16A and a pull function 16B. FIG. 7A illustrates the push function 16A logic and pull function 16B logic that is operative in the device 11.

Push Function 16A

If (storage content type 1 exceeds T2) read priority of items, their individual size, and frequency of use.

Identify items with lowest priority, highest size, and lowest frequency of use in a time period Transfer identified data items to push buffer to achieve/maintain memory use threshold Repeat for different type storage content Push items from push buffer to server in off peak time Pull Function 16B If (content type 1 falls below Threshold T3) read priority of items, their individual size, and frequency of use Send pull command to server to fetch items to achieve/maintain memory use threshold Receive items in device pull buffer at an off-peak time from server Repeat for different type storage content Move items to respective storage memory from pull buffer.

Slave Push Pull Function 26

The slave push-pull function operative in the server 22 has push logic 26A and pull logic 26B. FIG. 7B illustrates the push logic 26A and pull logic 26B that is operative in the server 22, working in conjunction with device 11.

Push Logic 26A

IF (detect push command) Identify Account

Verify security association

Receive and store data with meta data

Confirm status to device

Pull Logic 26B

IF (detect pull command) Identify Account

Verify security association

Fetch data and push data to device

Confirm status to device

Search/Retrieve Function 18

There is a search and retrieve function 18 operative in the device 11 that may be a part of the SMRM function 14. Technology, in general for such a search and retrieve function is prior art. In the embodiments described herein, the unique user interface features of such a search and retrieve function 18 are not prior art. These unique user interface features of the search and retrieve function 18 are described herein with the help of FIG. 8.

FIG. 8 is a simplified illustration of the steps used in a user interface that is operable in device 11, for a search and retrieve function 18.

At step 18A, the user interface enables a device user to select type of storage content 18A from one of the types described earlier with the help of FIGS. 4 and 5

At step 18B, user selects a time window, such as one month or three month etc.

At step 18C, these selections 18A and 18B causes the search function 18 to display the list of items that satisfy these two selection criterions. This action displays all the items that are stored either in the device 11 or the server 22, where the content that are present in device 11 are highlighted with a different color or shade, and preferably a darker shade relative to the items that are stored in the server 22. The dark and light shade of the items are intended to signify to a user and provide a easy discernible clue which items are present in the foreground or in the device 11 and which items are stored in the background.

At step 18D, enables identification of items in the server to be retrieved to device 11.

At step 18E, enables activation of a retrieve function.

At step 18F, Immediately the change in the color of the item is visible, while a pull command from the server is executed.

At step 18G, the operation may be repeated for different types of content and by a date window for each type.

Thus, function 18 enables a user to have visibility of the all types of data items in both the device 11 and virtual memory available and for use by the device 11.

Setup Function 21

The set up function 21 sets up the interface between the device 11 and the wireless server 22. The setup primarily involves setting up a security association between the device 11 and the server 22 for future exchange of data between them. The setup function 21 uses logic 19 that is operable in the device 11 and as illustrated with reference to FIG. 9A.

Figures 9A, 9B:
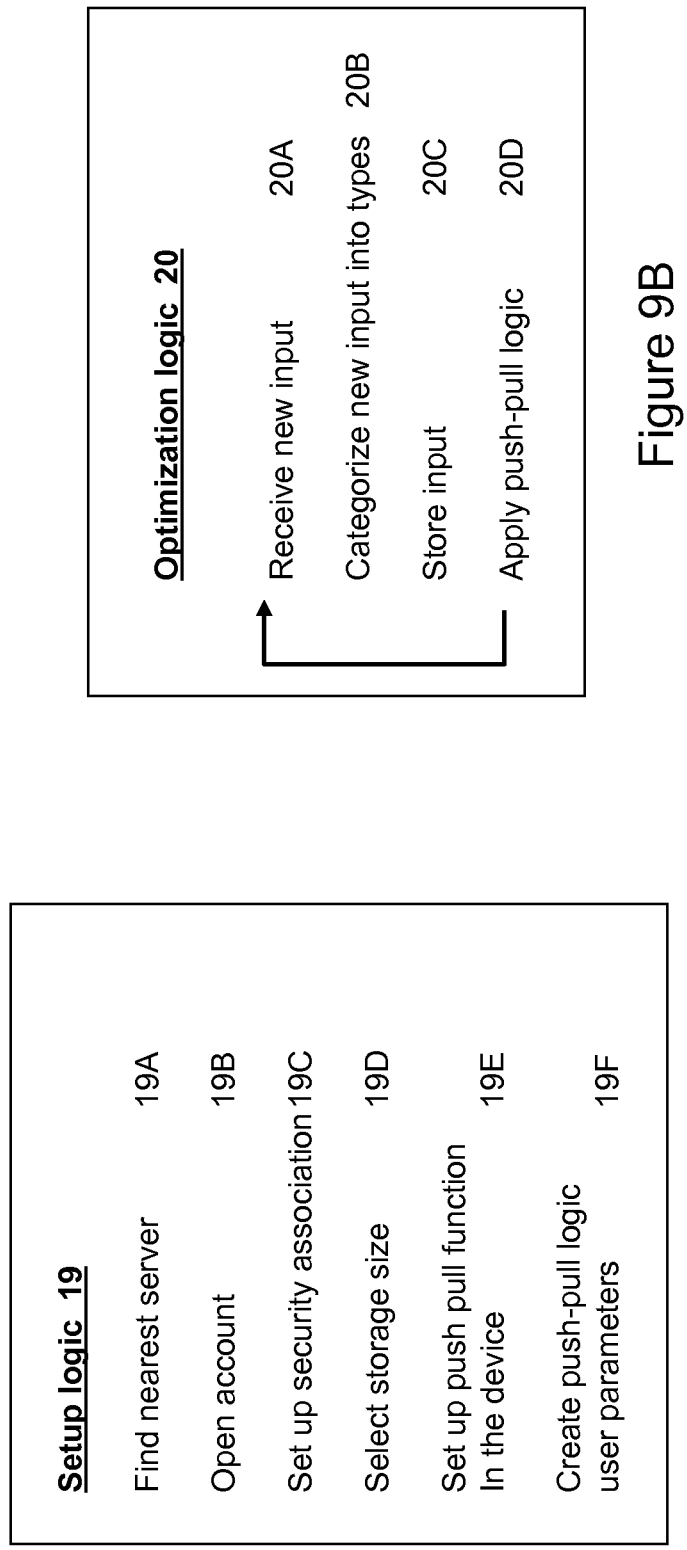

With reference to FIG. 9A, the method steps of the logic 19 are illustrated where not all the steps may be needed or carried out in the order specified.

At step 19A, find nearest server to device 11's location, based on GPS location data of the device 11 and a table of servers and their physical location.

At step 19B, open a user account in the server 22

At step 19C, set up a security association

At step 19D, select a virtual storage size that may be provided by default

At step 19E, set up push pull function operation

At step 19F, create push-pull logic user parameters 31

Optimization Function 20

Optimization function 20 is used to optimize the initial settings of the parameters 31, including the various thresholds. The optimization function is programmed to assess the rate of new content for different data types that may be added to the memory 30C, as had been illustrated earlier in FIG. 3B. The optimization function 20 is there to minimize the use of the push-pull function 16.

When that rate and content of new data that is being added to memory 30C, may lead to new content of a given data type that would exceed the initial allocation, of that data type, the optimization logic increases the initial allocation of memory of that data type. That rate and type of new content that is being added to the memory 30C of the device 11 creates a user profile how that particular user uses memory 30C and provides a basis for reallocation of the different data types and their initial allocations to those that are more applicable for a particular user.

Optimization function 20 optimizes the parameters 31 based on actual use of the storage memory and the new content received therein as had been illustrated with reference to FIG. 3B earlier.

FIG. 9B illustrates the optimization logic 20 of the optimization function 20 and FIG. 9C illustrates logic 21 of how when the new content is added it is stored in its respective storage content area.

With reference to FIGS. 9B and 9C, the method steps of the logic 20 and logic 21 are illustrated where not all the steps may be needed or carried out in the order specified.

At step 20A, receive new input into device 11

At step 20B, categorize new input into storage types

At step 20C, store new input into respective storage content

At step 20D, apply push-pull logic

At step 20E, based on rate of new content added to device for individual storage types, IF (rate of new content added) exceeds=Threshold Decrease threshold T1

At step 20F, repeat for storage types

Push Pull Buffer Logic 17

FIG. 9D illustrates the push pull buffer logic how and when the placed data content in push-pull buffer 60 is moved to the storage 30C or the respective storage in the virtual memory in the server 22.

With reference to FIG. 9D, the method steps of the logic 17 are illustrated where not all the steps may be needed or carried out in the order specified.

At step 17A, IF (buffer has content) determine type of content

At step 17B, IF (buffer content is from memory 30C) Schedule push of content to server 22.

At step 17C, IF (buffer content is from server 22), determine type of content and move to respective type storage 30C.

FIG. 10 illustrates a method for a mobile handheld wireless communication device, where not all the steps may be used or used in the order specified.

At step 100, having by the mobile handheld wireless communication device a storage memory resource management function operative in a processor and a memory of the device;

At step 102, managing by the resource management function storage memory resources in the device by dynamically determining a storage level of content in storage memory of the device and pushing content exceeding a storage threshold A to a nearest wireless accessible server, and pulling content from the server below a storage threshold B, thereby minimize the size of storage in the device and thus minimize size and weight of the device in user hands.

At step 104, allocating by the function device storage, not used by device OS, into different types of storage based on types of data being stored therein;

At step 106, partitioning the storage content into categories of, images, video clips, application categories, music files, and personal data related to contacts, medical, financial data, business data, and e-mails.

At step 108, assigning each category of data a user settable storage memory and a storage memory threshold;

At step 110, setting the storage memory threshold initially at 50% of the storage memory allocated to that category of content.

At step 112, allocating by the function a priority of storage content for each item of content for each category of content based on user set priority and/or frequency of use.

At step 114, maintaining by a function a table of servers and their physical location and their URL addresses;

At step 116, determining by the function nearest server based on GPS data of the device and uses the nearest server for pushing and pulling content from and to the server.

At step 118, having a search and retrieve function that searches and retrieves stored contents in either the device-storage or in the wireless-accessible server.

At step 120, having a user interface by the search and retrieve function has a user interface providing for a selected data type and time window, display of list of items that are in the device in color A and those that are in the server in color B.

At step 122, enabling by the user interface selection of the items in the list and their movement from either the device to the server or from the server to the device.

At step 124, updating by the user interface, after movement of data items from the server to the device or device to server, the color display of the items in the list of items.

A mobile handheld wireless communication device has a storage memory resource management function operative in a processor and a memory of the device. The resource management function manages storage memory resources in the device by dynamically determining a storage level of content in storage memory of the device and pushing content exceeding a storage threshold A to a nearest wireless accessible server, and pulling content from the server below a storage threshold B, thereby minimize the size of storage in the device and thus minimize size and weight of the device in user hands.

The function allocates device storage, not used by device OS, into different types of storage based on types of data being stored therein. The storage content is partitioned into categories of images, video clips, application categories, music files, and personal data related to contacts, medical and financial data, business data, and e-mails. Each category of data is assigned a user settable storage memory and a storage memory threshold. The storage memory threshold is initially set at 50% of the storage memory allocated to that category of content.

The function allocates a priority of storage content for each item of content for each category of content based on user set priority and/or frequency of use.

A function that maintains table of servers and their physical location and their URL addresses. The function determines nearest server based on GPS data of the device and uses the nearest server for pushing and pulling content from and to the server.

The device has a search-and-retrieve function for searching and retrieving stored contents in either the device storage or in a wireless accessible server. The search and retrieve function has a user interface that provides for a selected data type and time window, display of list of items that are in the device in color 1 and those that are in the server in color 2. The user interface enables selection of the items in the list and their movement from either the device to the server or the server to the device.

A wireless communication device interfaces with a wireless server and stores part of the storage content of the device in the storage memory of the device and a part in the wireless server. A search and retrieve function that displays location of stored contents in either the device storage or in the wireless accessible server. The search and retrieve function has a user interface that provides for a selected data type and time window, display of list of items that are in the device in color A and those that are in the wireless server in color B. The user interface enables selection of the items in the list and their movement from either the device to the server or the server to the device. The user interface updates, after movement of data items from the server to the device or device to server the color display of the items in the list of items.

In summary, the embodiments herein are on a thin smart phone device that provide for reduced storage memory and uses virtual memory in a wireless accessible server thus without the need to burden the handheld device with unnecessary large memory storage. This it is believed provide more user friendly form-factor or the device 11 for that is held in the palm of the human hand when used and provides for lighter and/or smaller size of the sensor body.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A mobile handheld wireless communication device, comprising:
   the mobile handheld wireless communication device has a storage memory resource management logic operative in a processor and a memory of the device wherein the logic accounts for memory storage in the device based on different types of memory use, including images, video, applications, e-mails, and personal data but excluding operating system to facilitate dynamic transfer from each of the memory types in the device to a wireless server and a dynamic transfer from each of these memory types in the wireless server to the device;
   the logic manages storage memory resources for each of the memory types and maintains at least three different parameters for each of the memory types of (i) a frequency of prior use of a data item, (ii) a storage threshold A, and (iii) a storage threshold B;
   the logic automatically transfers digital content below the frequency of prior use threshold in the device and exceeding the storage threshold A for the storage memory of the device to a nearest wireless accessible server, wherein the logic using a GPS function in the device determines the nearest wireless accessible server; and
   the logic automatically transfers digital content from the wireless accessible server below the storage threshold B for the storage memory of the device, thereby the logic optimizes the size of storage in the device and thus minimize size and weight of the device in user hands.

2. The device as in claim 1, comprising:
   a. the logic allocates device storage, not used by device OS, into different types of storage based on types of data being stored therein;
   b. the storage content is partitioned into categories of images, video clips, application categories, music files, and personal data related to contacts, medical and financial data, business data, and e-mails.

3. The device as in claim 2, comprising:
   a. each category of data is assigned a user settable storage memory and a storage memory threshold;
   b. the storage memory threshold is initially set at 50% of the storage memory allocated to that category of content.

4. The device as in claim 3, comprising:
   the logic allocates a priority of storage content for each item of content for each category of content based on user set priority and/or frequency of use.

5. The device as in claim 1, comprising:
   a. a function that maintains table of servers and their physical location and their URL addresses;
   b. the function determines nearest server based on GPS data of the device and uses the nearest server for pushing and pulling content from and to the server.

6. The device as in claim 1, further comprising:
   a search and retrieve function for searching and retrieving stored contents in either the device storage or in a wireless accessible server.

7. The device as in claim 6, further comprising:
   the search and retrieve function has a user interface that provides for a selected data type and time window, display of list of items that are in the device in color 1 and those that are in the server in color 2.

8. The device as in claim 7, further comprising:
   the user interface enables selection of the items in the list and their movement from either the device to the server or the server to the device.

9. A method for a mobile handheld wireless communication device, comprising the steps of:
   providing by the mobile handheld wireless communication device a storage memory resource management logic operative in a processor and a memory of the device, wherein accounting by the logic for memory storage in the device based on different types of memory use, including images, video, applications, e-mails, and personal data but excluding operating system for facilitating dynamic transfer from each of the memory types in the device to a wireless server and a dynamic transfer from each of these memory types in the wireless server to the device;
   managing by the logic storage memory resources for each of the memory types and maintaining at least three different parameters for each of the memory types of (i)

a frequency of prior use of a data item, (ii) a storage threshold A, and (iii) a storage threshold B;

transferring automatically by the logic digital content below the frequency of prior use threshold in the device and exceeding the storage threshold A for the storage memory of the device to a nearest wireless accessible server, wherein determining by the logic, using a GPS function in the device, the nearest wireless accessible server; and transferring automatically by the logic digital content from the server below the storage threshold B for the storage memory of the device, thereby optimizing the size of storage in the device and thus minimize size and weight of the device in user hands.

10. The method as in claim 9, comprising the steps of:
a. allocating by the logic device storage, not used by device OS, into different types of storage based on types of data being stored therein;
b. partitioning the storage content into categories of images, video clips, application categories, music files, and personal data related to contacts, medical and financial data, business data, and e-mails.

11. The method as in claim 10, comprising the steps of:
a. assigning each category of data a user settable storage memory and a storage memory threshold;
b. setting the storage memory threshold initially at 50% of the storage memory allocated to that category of content.

12. The method as in claim 11, comprising the steps of:
allocating by the logic a priority of storage content for each item of content for each category of content based on user set priority and/or frequency of use.

13. The method as in claim 9, comprising the steps of:
a. maintaining by a function a table of servers and their physical location and their URL addresses;
b. determining by the function nearest server based on GPS data of the device and uses the nearest server for pushing and pulling content from and to the server.

14. The method as in claim 9, further comprising the steps of:
having a search and retrieve function for searching and retrieving stored contents in either the device storage or in a wireless accessible server.

15. The method as in claim 14, further comprising the steps of:
having a user interface by the search and retrieve function has a user interface providing for a selected data type and time window, display of list of items that are in the device in color 1 and those that are in the server in color 2.

16. The method as in claim 15, further comprising the steps of:
enabling by the user interface selection of the items in the list and their movement from either the device to the server or the server to the device.

* * * * *